United States Patent [19]

Hull et al.

[11] Patent Number: 5,313,851

[45] Date of Patent: May 24, 1994

[54] REUSABLE MASS PROPULSION SYSTEM

[76] Inventors: Harold L. Hull, 401 Canyon Way #43, Sparks, Nev. 89434; Donald E. Joslin, P.O. Box 583, Kings Beach, Calif. 96143

[21] Appl. No.: 840,726

[22] Filed: Feb. 21, 1992

[51] Int. Cl.⁵ .............................................. F16H 33/20
[52] U.S. Cl. ..................................... 74/84 R; 180/7.1
[58] Field of Search ................ 74/84 R, 84 S; 180/7.1

[56] References Cited

U.S. PATENT DOCUMENTS

| | | | |
|---|---|---|---|
| 3,424,401 | 1/1969 | Maurer | 244/1 |
| 3,437,381 | 4/1969 | Bodine | 299/37 |
| 3,492,881 | 2/1970 | Auweele | 74/84 S |
| 3,504,868 | 4/1970 | Engelberger | 244/1 |
| 3,530,617 | 9/1970 | Halvorson et al. | 74/84 S |
| 3,818,767 | 6/1974 | Donohue et al. | 74/5.5 |
| 3,862,732 | 1/1975 | Wyatt et al. | 244/165 |
| 3,955,784 | 5/1976 | Salkeld | 244/172 |
| 4,078,747 | 3/1978 | Minovitch | 244/159 |
| 4,078,748 | 3/1978 | Sen | 244/170 |
| 4,087,064 | 5/1978 | Knap | 244/172 |
| 4,132,067 | 1/1979 | Alderman | 60/204 |
| 4,230,294 | 10/1980 | Pistiner | 244/170 |
| 4,326,684 | 4/1982 | Rosen | 244/158 R |
| 4,631,971 | 12/1986 | Thornson | 74/84 R |
| 4,939,976 | 7/1990 | Minovitch | 89/8 |

OTHER PUBLICATIONS

Abstract; DT2914038; Putz; Oct. 16, 1980.
Article; "Product Engineering"-Inertial drive; Mar. 14, 1966-p. 63 vol. 37 #6.

Primary Examiner—Allan D. Herrmann

[57] ABSTRACT

A reusuable mass propulsion system comprising; means to change the force created by a linear accelerating mass into rotating kinetic energy, the kinetic energy being in a different plane and dimension which, in the process, gives at least 4 distinct thrusts to its vehicle host. The apparatus uses no magnetic forces, gases or particle discharges and requires only a power source such as solar energy for its activation.

10 Claims, 2 Drawing Sheets

REUSABLE MASS PROPULSION SYSTEM

FIELD OF THE INVENTION

This invention relates to propulsion systems and more particularly to propulsion systems that require no expendable or combustible fuel.

BACKGROUND OF THE INVENTION

Propulsion of an object is generally only obtained by movement of air or other gases in opposite direction to the movement of the object under the effect of jet or propeller systems. In the absence of a suitable atmosphere, for example in space, propulsion is generally obtained by rocket systems or by other systems which involve the projection of particles at high velocity from the object. Such systems of course require the consumption of fuel since the fuel must form the particles to be projected.

Attempts have been made for many years to develop a propulsion system which generates linear movement from a rotational drive. Examples of this type of arrangement are shown in a book entitled "THE DEATH OF ROCKETRY" published in 1980 by Joel Dickenson and Robert Cook.

U.S. Pat. No. 4,631,971 proposes a propulsion system that provides two symmetrical wheels mounted in the same plane for rotation about parallel axes at right angles to the plane and driven synchronously in the opposite direction. This device requires electromagnetic restraint to provide whip-like action inducing a resultant force in a direction at right angles to the plane containing the axes of the wheels. This requires the use of a magnetic field which may be affected by any other magnetic field disturbance which can cause interruption of the cycle resulting in mis-direction of the force.

U.S. Pat. No. 4,132,067 proposes the use of sound waves through a medium such as water or air with control means to allow particles of the medium to pass through the barrier when moving in one direction under the influence of the oscillatory field, but prevents the particle from passing back through the barrier when moving in the opposite of oscillation under the influence of the field to produce a net force imparted to the object, however, the medium used is subject to other forces if used in outer space such as heat, "flash-points" and loss due to leakage.

There is a need, therefore, for apparatus and a method to provide a net force in one direction which may be effected by adverse forces of random magnetism, heat, cold, expansion or contraction of gases, etc., but relies on the controlled movement of a reusable mass resulting in such a net force.

SUMMARY

It is therefore a primary object to provide a new and unusual propulsion system which obtains propulsive force in a resultant direction without the necessity for the opposite projection of particles.

It is another object to provide a propulsion system which generates linear movement of a mass from a rotational drive.

It is still another object to provide a propulsion system which provides apparatus and method to change the linear movement of a mass to rotational movement in another dimension at 90 degrees to the linear movement.

Still another object is to utilize the "billiard-ball" effect to change the direction of momentum of a mass to another direction.

Other objects and advantages will become obvious when taken into consideration with the following drawings and specifications.

DETAILED DESCRIPTION OF THE DRAWINGS

Figure 1:
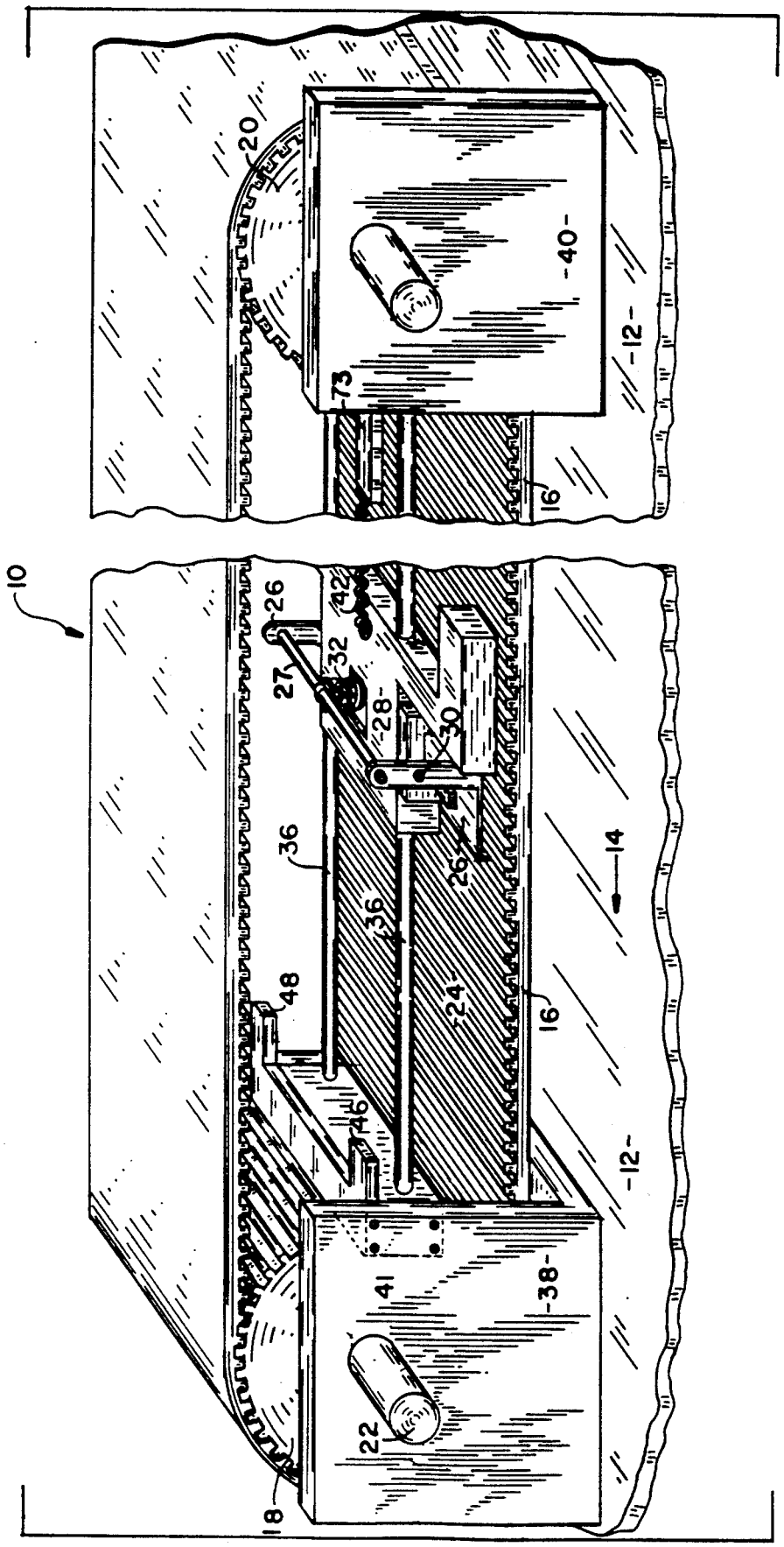
FIG. 1 is a perspective view of the linear drive means.
Figure 2:
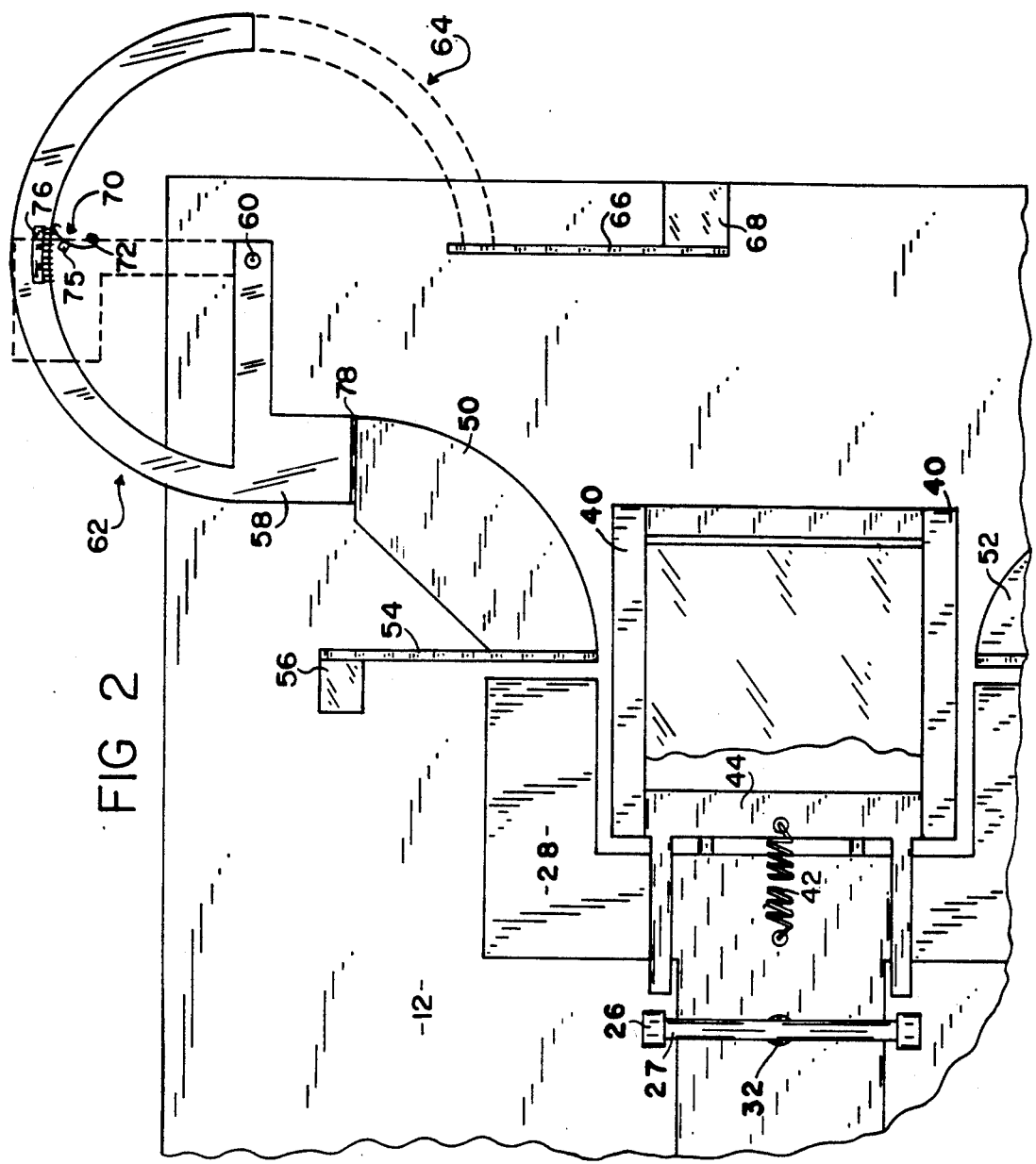
FIG. 2 is a top view of the apparatus to convert the linear drive to rotational energy in another plane.
Figure 3:
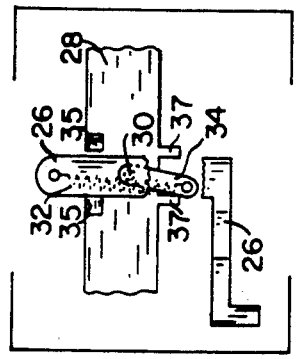
FIG. 3 is a plan view of the latching mechanism.
Figure 4:
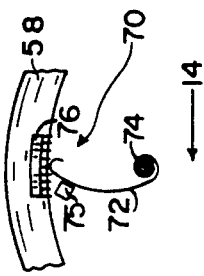
FIG. 4 is a plan view of a dampening mechanism.

Referring now in detail to the drawings wherein like characters refer to like elements throughout the various drawings in FIG. 1, 10 is a over view of the section of apparatus which converts rotational energy, which may be provided by a suitable energy source, (not shown) such as solar power, into a steady form of linear motion which has no continuing acceleration in one direction but has acceleration in the opposite direction. 12 is the host vehicle with the desired propulsion being in the direction of arrow 14 with 16 being a toothed belt drive cooperating with drive gear 18 and idler gear 20, drive gear 18 being suitably driven by solar power or the like through shaft 22 respectively. The bottom portion 24 of belt 16 moves in the direction of arrow 14 and in FIG. 1 is shown as engaging trip mechanism 26 including rod 27 which is suitably journaled to weight 28 at pivot 30 respectively and having a first, and second position which is mantained by spring 32 as shown in ghost lines in FIG. 2 and pivoting member 34, 35, and 37, respectively, being stops for elements 34 and 26. Weight 28 which we shall also refer to as a first mass has a sliding relationship with parallel rods 36, rods 36 being suitably attached to supports 38 and 40, through cross member 41 respectively, 42 being an elastic member such as a spring suitably attached to weight 28 on one of its ends with its distal end being attached to cross member 44 as shown in FIG. 2 thus providing a means to store energy when weight 28 is at its extreme forward position. 26 is a trip mechanism which operates a spring loaded toggle mechanism as in a light switch mechanism which is spring loaded and has a first and second position and as more clearly illustrated in FIG. 3, with the spring being shown by ghost lines. When trip mechanism 26 is triggered by contacts 46 and 48, respectively, the trip mechanism 26 is released from the toothed belt 16 and weight 28 is accelerated by elastic member such as spring 42 with the resulting force propelling the host vehicle in the direction of arrow 14 and the weight 28 in the opposite direction.

When weight 28 reaches its peak acceleration (which is the end of its stroke) it strikes members 50 and 52, respectively, members 50 and 52 which we shall also refer to as a second pair of masses being supported by flat springs 54 and 66 respectively which are suitably anchored by blocks 56, to the host vehicle 12, springs 54 and 66 respectively supporting members 50 and 52 in a suspended state with one of their ends in contact with rotatably mounted members 58 which we shall also refer to as a third pair of masses which are mounted by means such as bolts and bearings to the host vehicle. (only one shown in FIG. 2) which are substantially in the shape of wedge shaped quarter circles having first and second edges mounted and supported at their apexes by bearings 60. Rotatable member 58 is shown in a fir 62 and its second ghost position 64 and when in its ghost position is in contact with flat spring 66. Flat spring 66 is suitably anchored through block 68 to host vehicle 12.

When the weight 28 strikes members 50 and 52, respectively, the "billiard-ball" effect takes place, weight 28 thus transferring its linear momentum to members 50 and 52, respectively, which in turn transfers the "blow" to rotatably mounted member 58, (and its mirror-image not shown) which in turn rotates on its bearing 60 and when reaching its ghost positions 64 transfers its momentum to spring 66 which in turn urges the host vehicle again in the direction of arrow 14.

It is to be noted that rotatably mounted member 58 also gives an urge to the host vehicle 12 in the direction of arrow 14, due to the centrifugal force generated in its quarter turn to its ghost position 64.

The spring 66 splits its energy by driving the host vehicle in the direction of arrow 14 and the half circular member 58, member 58 now being urged the opposite way on its axis but the momentum of the half circle member 58 is now substantially depleted and is further slowed down by dampening means 70 which, being suitably anchored to the ghost vehicle 12, gives another urge to the host vehicle in the direction of arrow 14.

Dampening means 70 is any suitable dampening means such as a coiled spring 72 suitably anchored to the host vehicle 12 at point 74 and held in a tensioned position by stop 75 with 76 being a series of bristle like members suitably anchored to member 58 which during the latter part of the return motion of member 58 engages the distal end of spring 72, thus imparting another urge to host vehicle in the direction of arrow 14.

When the weight 28 strikes 50 and 52, respectively, trip mechanism 26 is also tripped by contact 73 and once again is engaged with the bottom portion 24 of toothed belt 16 and the cycle begins again.

It will be noted that when the weight 28 is engaged to toothed belt 16 that the momentum transfer is slight as the weight simply "grabs" the belt and is moved at a constant rate without accelerating on its journey to its "loaded" end, but when it is released, it accelerates rapidly thus imparting thrust to the host vehicle in the direction of arrow 14. The impact or sudden blow of the weight 28, transfers its linear motion to the two suspended members 50 and 52, respectively, which now by the "billiard-ball" effect causes the linear momentum of the weight 28 to be transfered to rotational kinetic energy in a different plane which causes the energy released to reach a state of equilibrium in a different dimension.

It will also be noted that FIG. 2 shows substantially only one of the devices in detail which transfers the linear motion of the weight 28 into rotational kinetic energy in a different plane, but it is to be understood that a second mirror image device is taught which cooperates with weight 28 in the same manner. 78 may be a permanent magnet too lightly hold in place rotatable element 58 to elements 50 and 52, respectively.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described our invention, what we claim as new and desire to secure by letters patent is;

1. Apparatus for developing a propulsion force comprising;

a first and second drive gear, mounting means to mount said gears to a host vehicle, means to drive at least one of said gears, a continuous flexible connecting member, said connecting member being in communication with said gears to provide a continuous linear motion, a first mass, a mounting means for said first mass, said mounting means allowing said first mass to reciprocally travel in a linear direction between a first and second position on said last named mounting means, means to engage and dis-engage said first mass with said connecting member, means to mount said mounting means for said first mass, in a parallel relationship with said connecting member, an elastic member, said elastic member having a first and second end, said first end having means to be affixed to said first mass, said second end having means to be affixed to said means to mount said gears to a host vehicle, a second pair of masses, said second pair of masses being substantially in the form of wedge shaped quarter circles having first and second edges said edges joining at their apex, means to mount said second pair of masses at their apexes to said host vehicle on a plane substantially 90 degrees to said linear direction of said reciprocal travel of said first mass, said last named mounting means holding said second pair of masses in a suspended state, a third pair of masses, said third pair of masses being substantially in the form of wedge shaped quarter circles, having first and second edges, said edges joining at their apex, means to pivotably mount said third pair of masses at their apexes to said host vehicle on a plane substantially 90 degrees to said linear direction of said reciprocal travel of said first mass, said third pair of masses having a first and t second position, said first position of said third pair of masses allowing said first edges of said third masses to be in a touching relationship with said second edges of said second pair of masses, said third masses having most of their mass on their said first edges, resilient stop means for said third pair of masses when said third pair of masses reach their said second position, said second position being substantially one quarter turn from said first position, said resilient stops being capable of exerting enough return force to said third pair of masses to return said third pair of masses to their said first positions, dampening means, said dampening means being in communication with said third pair of masses, said dampening means allowing said third pair of masses to freely move from their said first position to their said second position, said dampening means partially restraining said third pair of masses on their return to their said first position, whereby, when said first mass is engaged with said connecting member between said gears, said first mass travels in a non-accelerating linear direction corresponding to the direction in which said host vehicle is traveling assuming a tensioned first position by stretching said elastic member between said first mass and said host vehicle whereupon, when said first mass is released from said connecting member, said first mass is accelerated in the opposite direction in which said host vehicle is traveling imparting thrust to said host vehicle, said first mass then striking said first edges of said second pair of masses when it reaches its maximum acceleration thus imparting its force to said second pair of masses, said second masses imparting said force through their, said second edges to said first edges of said third pair of masses, said third masses being rotated on their axis thus imparting by centrifugal force a second thrust to said host vehicle, said third pair of masses upon reaching their said second position striking their said second edges against said resilient stops thus imparting a third thrust to said host vehicle, said third pair of masses then being returned to their said first positions by force from said resilient stop, and, during the return of said third pair of masses to their said first positions said dampening means imparts a forth thrust to said host vehicle.

2. The apparatus of claim 1 in which said continuous flexible member is a belt.

3. The apparatus of claim 2 in which said belt is a toothed belt, said toothed belt cooperating with said gears.

4. The apparatus of claim 1 in which said mounting means for said first mass are at least two rods, said rods having a sliding relationship with said first mass.

5. The apparatus of claim 1 in which said means to engage and dis-engage said first mass with said connecting member is a spring loaded toggle mechanism.

6. The apparatus of claim 1 in which said means to mount said second pair of masses at their apexes to said host vehicle is a flat spring.

7. The apparatus of claim 1 in which means to pivotably mount said third pair of masses to said host vehicle is a bolt and bearing.

8. The apparatus of claim 1 in which said touching relationship between said first edges of said third pair of masses and said second edges of said second pair of masses include a permanent magnet.

9. The apparatus of claim 1 in which said resilient stop means for said third pair of masses is a flat spring.

10. The apparatus of claim 1 in which said dampening means is a coiled spring, said coiled spring being affixed to said host vehicle with its distal end cooperating with bristle-like members affixed to substantially the said second edge portions of said third pair of masses.

* * * * *